Oct. 31, 1950 K. L. SANFORD 2,528,085
FOCUSING MECHANISM FOR TWIN LENS CAMERAS
Filed Jan. 7, 1948 2 Sheets-Sheet 1

INVENTOR.
Kenneth L Sanford,
BY Victor J. Evans & Co.
ATTORNEYS

Oct. 31, 1950 K. L. SANFORD 2,528,085
FOCUSING MECHANISM FOR TWIN LENS CAMERAS
Filed Jan. 7, 1948 2 Sheets-Sheet 2

INVENTOR.
Kenneth L. Sanford,
BY Victor J. Evans & Co.
ATTORNEYS

UNITED STATES PATENT OFFICE 2,528,085

FOCUSING MECHANISM FOR TWIN LENS CAMERAS

Kenneth L. Sanford, South Westport, Mass.

Application January 7, 1948, Serial No. 876

1 Claim. (Cl. 95—44)

My present invention relates to an improved camera of the twin lens type in which the picture to be photographed is viewed through a finder lens separate from the photographic lens and including especially means under control of the focusing device for the photographic lens to pivot the finder lens on its vertical axis so that the optical axes of the two lenses will converge forward of the camera. The point of intersection will draw nearer to the camera as the photographic lens is focused on a point nearer the camera.

The purpose of such a control is to avoid parallax in the twin lens camera and thereby to avoid overlapping of the areas within the optical limits of the two lenses.

The device of my invention is adaptable equally well in reflex cameras as in direct view cameras and will enable the operator to positively identify the view to be photographed.

In the accompanying drawings I have illustrated one complete example of the physical embodiment of my invention according to the best mode I have thus far devised but it will be understood that various changes or alterations in the exemplified structure may be made within the scope of the appended claim.

Figure 1:
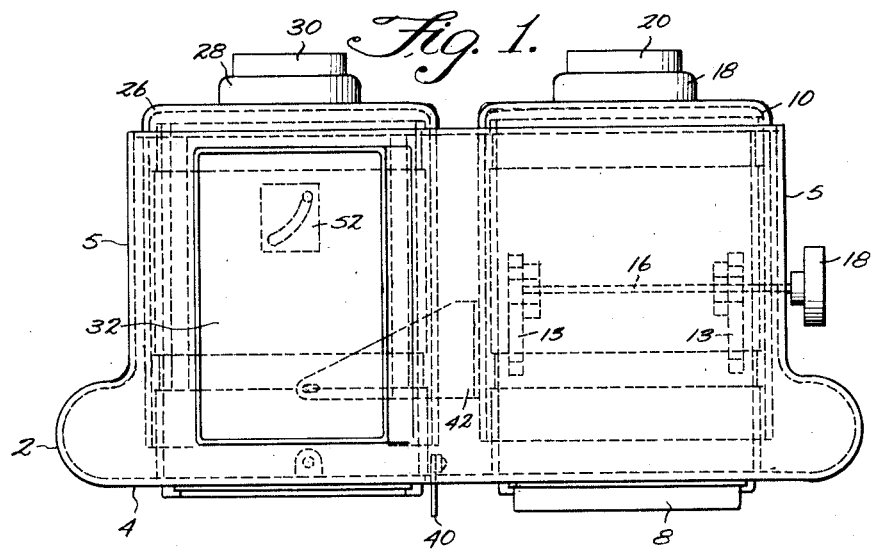
Fig. 1 is a top plan view of the camera of my invention focused at infinity.
Figure 2:
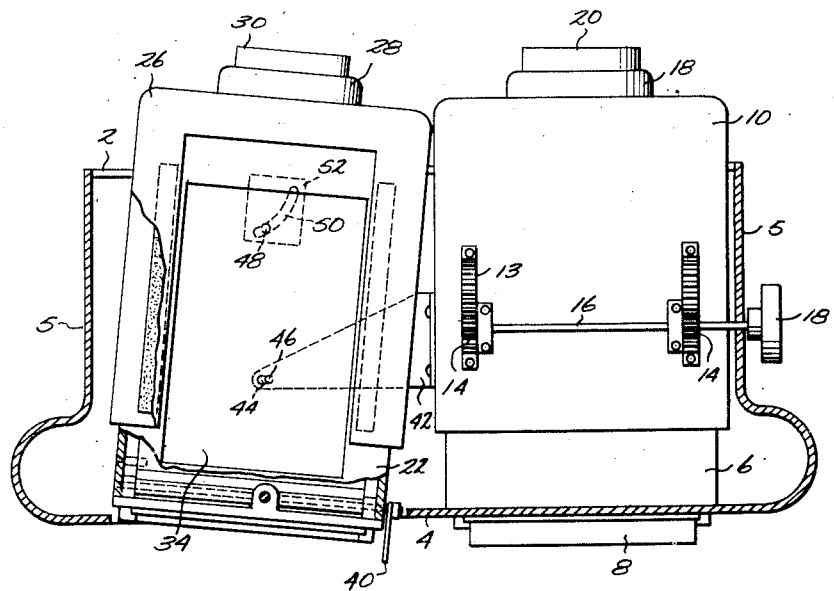
Fig. 2 is a similar view of the camera partially broken away and focused at its minimum photographing distance.
Figure 3:
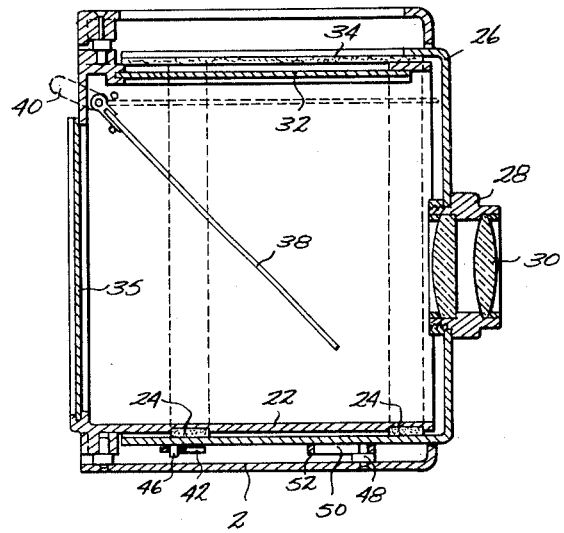
Fig. 3 is a vertical sectional view through the finder structure.
Figure 4:
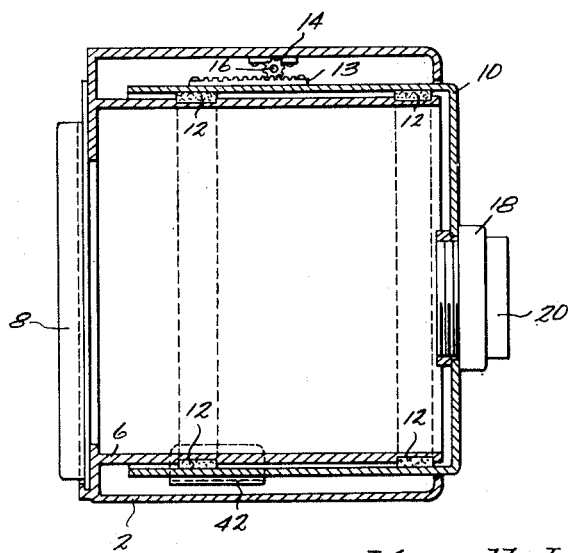
Fig. 4 is a vertical sectional view through the photographic structure.

Referring now to the drawings wherein I have illustrated the present preferred embodiment of my invention I employ a case or housing 2 of suitable material having a rear wall 4 and side walls 5, and open in the front.

In the photographic portion I employ a fixed, inner, tube 6 abutting the rear wall which is arranged to receive a film pack or plate in compartment 8. An outer tube 10 is slidable on the gaskets 12 and the rack bars 13 on the tube 6 co-act with the gears 14 on shaft 16 which is driven by exterior knob 18. The outer end of tube 10 is provided with cylinder 18 for the lenses 20 of conventional design. Obviously the outer tube is moved along its optical axis to focus the lens with relation to the film at various distances.

In this type of camera the operator views his scene through a separate lens. For this purpose I have shown the inner tube 22 formed with gaskets 24 upon which is fixed the outer tube 26 having cylinder 28 and lenses 30.

The upper wall of the tube 22 has a glass portion 32 and the upper wall of tube 26 has a ground glass screen 34 aligned above the portion 32. The rear wall of the inner tube also has a ground glass screen 35 and the mirror 38 pivotally mounted in the inner tube 22 and formed with lever 40 permits the operator to view the scene directly on the glass screen 39 with the mirror up, or by reflex display on the screen 34.

Normally the longitudinal axes of the two lenses are fixed and parallel. However, according to my invention, the outer tube 10 has an extension plate 42 having an elongated slot 44 receiving the pin 46 fixed to the tube 26. Also on the housing 2 I secure a pin or securing element 48 located in the arcuate slit or slot 50 of plate or body member 52 on the tube 26. The pin 48 and body member 52 coact to guide or control the path of movement of the parts of the finder assembly.

Thus as the outer tube 10 is moved out to shorten the focusing distance between the lens and the object, the tubes 22 and 26 will be pivoted so that the longitudinal axes will converge and cross.

The operator will thereby see the same object as is passed through the photographic lens and the picture obtained will be the same as that viewed through the finder.

Having thus fully described my invention, what I claim as new and desire to secure by Letters Patent is:

In a device of the class described, a hollow housing provided with an open front end, a photographic assembly and a finder assembly arranged in said housing, said photographic assembly comprising a stationary inner tube, an outer tube of greater size than said inner tube telescopically connected to said inner tube and adapted to slide axially with respect to the latter, lenses carried by the front end of said outer tube and coaxial therewith, manually operable means for causing sliding movement of said outer tube relative to said inner tube, said finder assembly embodying an outer tube and an inner tube of smaller size than the corresponding outer tube of said finder assembly, said last-named inner tube having its rear end pivotally connected to the rear of said housing, said last-named outer tube being telescopically mounted for axial sliding movement with respect to said last-named inner tube, coacting means on the tubes of said finder assembly for permitting viewing of the object to be photographed, the tubes of the photographic assembly being arranged in side-by-side relation with respect to the tubes of said finder assembly, a plate having one end secured to one side of the outer tube of said photographic assembly and extending under the finder assembly, there being a slot arranged in the other end of said plate, the slot in said plate extending at right angles to the direction of movement of the outer tube of said photographic assembly, a pin connected to the bottom of the outer tube of said finder assembly and projecting into said slot whereby sliding movement of the outer tube of said photographic assembly causes sliding movement of the outer tube of said finder assembly, a horizontally disposed body member secured to the bottom of the outer tube of said finder assembly, there being an arcuate slit arranged in said body member, said slit lying in the same plane as said body member, and a pin projecting upwardly from said housing for engagement with the slit in said body member, said last-named pin and body member coacting to guide the tubes of the finder assembly when the outer tube of the photographic assembly is manually adjusted.

KENNETH L. SANFORD.

REFERENCES CITED

The following references are of record in the file of this patent:

UNITED STATES PATENTS

| Number | Name | Date |
|---|---|---|
| 552,246 | Haarstick | Dec. 31, 1895 |
| 1,528,464 | Beidler et al. | Mar. 3, 1925 |
| 1,566,217 | Krone | Dec. 5, 1925 |
| 1,968,476 | Burns | July 31, 1934 |
| 2,003,754 | Miller | June 4, 1935 |

FOREIGN PATENTS

| Number | Country | Date |
|---|---|---|
| 712,998 | France | Aug. 3, 1931 |